United States Patent Office 3,090,692
Patented May 21, 1963

3,090,692
HYDRAULIC CEMENT ADDITIVES AND CEMENT COMPOSITIONS CONTAINING SAME
Thomas M. Kelly, Chagrin Falls, and Richard C. Mielenz, Beachwood, Ohio, assignors, by mesne assignments, to Martin-Marietta Corporation, Chicago, Ill., a corporation of Maryland
No Drawing. Filed Nov. 6, 1959, Ser. No. 851,269
10 Claims. (Cl. 106—92)

This invention relates to an additive composition for incorporation in hydraulic cement or concrete mixes, and, more particularly, to harsh, dry or semi-dry mixes containing such additive composition and to new and improved products or structures made therefrom.

In recent years, the use of harsh, dry or semi-dry mixes, such as in the manufacture of concrete block, concrete pipe, and other concrete products and structures, has become an industry of great importance. Although these harsh mixes contain Portland cement, aggregate, and water, there is a substantial difference between such concrete mixes and conventional mobile or plastic concrete mixes. The problems involved in the use of relatively dry mixes are different from those encountered in the use of conventional concrete mixes, since the harsh mixes contain only a minimum of water instead of the larger quantities of water employed in the plastic concrete mixes to give mobility and flowability.

In spite of the fact that new and improved techniques have been developed in the plastic concrete art over the years, the technological advances in that field in general have been found to lack applicability to harsh, relatively dry concrete mixes. An example of this is the use of water-reducing and plasticizing agents as additives for plastic concrete mixes. In the plastic concrete field, the use of waste sulfite liquors and their derivatives has become widespread due to their ability to reduce the amount of water required for a given consistency and therefore to produce high strength concrete while permitting reductions in the amount of cement in the mixes.

However, the use of waste sulfite liquors or their derivatives as additives for harsh, relatively dry concrete mixes has not been entirely satisfactory due to the erratic results obtained. For example, these additives are frequently ineffective in substantially improving the strength of the concrete. In addition, the ultimate concrete produced from these mixes frequently has an unattractive drab, grayish-brown appearance.

Because of the foregoing and other difficulties in the use of conventional concrete additives in harsh, relatively dry concrete mixes, the molded masonry unit industry particularly has been reluctant to use additives for fear that the concrete block, pipe, etc. produced would not be acceptable to the consumer.

However, as the masonry unit industry has developed and expanded, one of the more serious problems, particularly with block, has been the lack of uniformity of surface texture and color both with respect to the surface of an individual unit as well as the lack of uniformity from one unit to another which becomes apparent when units are placed together in a wall or other structure. Also, in the case of concrete block, the consumer generally prefers block of the lighter shades of color and those having a wavy textural effect known in the industry as a "water-webbed effect."

Although it is sometimes possible to produce concrete block with a fair degree of uniformity as far as the surface of an individual block is concerned, it has been extremely difficult, if not impossible, to regularly achieve a high degree of uniformity both as to the surface of an individual block and particularly from one block to another over an extended period of commercial operation.

Attempts have been made to produce a pleasing surface texture on the block or other molded masonry units by the use of an additional amount of water in the mix. However, this has not proven successful since the additional water may give the surface a smeared appearance and, in addition, may create problems in the molding and processing of the block.

The present invention provides a new additive composition which, when incorporated in concrete mixes, produces mixes which are more dense and cohesive and which results in the production of concrete having substantially improved early and ultimate strength. In addition, masonry units produced by employing mixes containing the additive composition of the present invention have a pleasing appearance because of their high degree of uniformity both of lightness of color and of surface texture. Moreover, the employment of the additive composition of the invention in harsh, relatively dry concrete mixes not only results in the solution of the aforementioned problems of producing aesthetically desirable masonry units having a high level of strength, but, also, masonry units of this high quality may be produced even when employing accelerated curing conditions, such as the steam curing operations which are coming into widespread use.

The employment of the additive composition of the invention in harsh, relatively dry mixes also provides a number of processing advantages. The filling of molds and forms is facilitated because of the lubricating and densifying effects achieved through the use of the additive composition. In addition, mixes containing the additive are less abrasive in character, thus reducing wear on the molds and forms and other parts of the equipment employed. These processing advantages result in an increased rate of production, less breakage and defects, and similar benefits.

The additive composition of the present invention comprises a mixture of the following ingredients:

(1) A carbohydrate which is a monosaccharide having 5 or 6 carbon atoms or a disaccharide which is a multiple of one of these monosaccharides.
(2) A water-soluble chloride.
(3) A water-soluble amine.
(4) A water-soluble ethylene oxide condensation product.

Although the specific function of the particular components in the action of the composition of the invention is not known with certainty, it appears that each of the components contributes to certain of the effects obtained. For example, it is believed that the carbohydrate component contributes to the improvement of the strength of the ultimate product or structure and, in addition, makes the mix more cohesive and dense. The chloride and amine, in addition to contributing to early and ultimate strength, are also believed to function with the carbohydrate to give increased workability and cohesiveness whether the mix be an ordinary concrete mix or a harsh, relatively dry mix as generally used in the manufacture of masonry units such as block. In the case of masonry units, the high, early strength permits the handling of the freshly molded units such as blocks, with less danger of breaking or cracking.

The ethylene oxide condensation product, among other things, is believed to contribute to the plasticity and denseness of the mix. In addition, in the manufacture of masonry units, the condensation product is believed to contribute to the action at the interface of the mold wall and the concrete in contact therewith which produces the pleasing surface texture.

The carbohydrate component of the additive composition of the invention, as stated above, may be a monosaccharide having 5 to 6 carbon atoms or a disaccharide which is a multiple of such monosaccharide. The monosaccharides employed are generally pentoses and hexoses and may contain terminal acid, ketone or aldehyde groups in place of one or both of the terminal hydroxy groups. For example, typical carbohydrates containing two terminal hydroxy groups are sorbitol, mannitol, and dulcitol; typical carbohydrates containing one or more terminal aldehyde groups are glucose, arabinose, mannose. Suitable carbohydrates containing terminal ketone and acid groups are fructose, sorbose, gluconic acid and citric acid. Of the disaccharides particularly useful are sucrose and related carbohydrates made up of two of the above monosaccharide units.

The proportion of the carbohydrate component included in the additive composition and incorporated in the harsh, relatively dry mixes for the purposes of the invention may range from about 0.01% to 0.1% or 0.2% by weight of the cement in the mix depending in part upon the retarding effect of the particular carbohydrate employed. The retarding effect of disaccharides such as sucrose is generally greater than that of the monosaccharides. For optimum results, the proportion of the carbohydrate is generally maintained between about 0.02% and 0.08% of the cement.

The water-soluble chloride component employed in the additive composition of the invention may be an alkali metal or alkaline earth metal chloride or ammonium chloride which is considered a metal chloride for the purposes of the present invention. Calcium chloride is preferred in most cases because of its low cost and ready availability.

The proportion of the chloride employed in the additive composition is generally in the range of about 0.05% to 0.3% by weight of the cement in the mix. However, in some instances, such as in cold weather, it may be desirable to include larger amounts of the chloride. In such cases, the amount of chloride may be increased up to 2% or so without deteriously affecting the mixes or the products or structures produced therefrom.

The water-soluble amine component of the additive composition may advantageously be a substituted or unsubstituted non-carboxylic amine, such as a primary, secondary, or tertiary alkyl amine. Examples of suitable amines are amines containing one or more alkyl groups such as mono, di, and triethanolamine, propanolamine, etc. Particularly advantageous for use as the amine component are substituted alkyl amines such as triethanolamine. If desired, the amine component may be made up of a mixture of two or more of the above amines as may be present in commercially available amine products. The amine component will generally be employed in an amount between about 0.01% and 0.1% by weight of the cement in the mix and preferably between about 0.015% and 0.06%.

As pointed out above, the fourth component of the additive composition in the present invention is a water-soluble ethylene oxide condensation product. Generally, these condensation products are obtained by condensing a number of mols of ethylene oxide with an aromatic organic compound such as a substituted or unsubstituted phenol or an aliphatic organic compound such as a fatty acid, alcohol, ester, aldehyde, amine, etc. Particularly advantageous for use in the additive composition of the invention are materials formed by the condensation of an aromatic compound with ethylene oxide, and preferably about 5 to 10 or 15 mols of the ethylene oxide. Among the substituted phenols employed, especially useful are those phenols having alkyl chains containing between about 4 and 12 carbon atoms. The number of mols of ethylene oxide may be varied depending upon the particular organic compound condensed therewith. As the proportion of ethylene oxide is increased, the solubility of the material in water will generally increase. Condensation products having low proportions of ethylene oxide and a relatively low water solubility may be used so long as the solubility is sufficient to permit dissolution in the mixing water of the small amount of the condensation product employed.

The proportion of the ethylene oxide condensation product employed depends to a large extent upon the particular material used. For example, in the production of molded masonry units, the proportion should be insufficient to increase the plasticity of the mix to the extent that the surface of the molded masonry unit becomes excessively wet so that smearing of the surface results when the unit is separated from the mold. On the other hand, the proportion of the condensation product should be sufficiently large to achieve the desired improvement in the plasticity, cohesiveness, and denseness of the mix. Generally, the proportion of the condensation product employed will be in the range of about 0.01% and 0.1% by weight of the cement present in the mix with amounts between about 0.01% and 0.05% being preferred.

In addition to the additive composition of the invention, other materials which are commonly employed in harsh, relatively dry mixes may be included so long as they do not impair the action of the additive composition. For example, pozzuolanic materials, flyash, other siliceous or non-siliceous fines, water repellents, air-entraining agents, and the like may be included in the mixes, if desired.

Mixes containing the additive composition of the invention may be formed or shaped into products or structures by any of the techniques to which such harsh mixes may be adapted. For example, in addition to the manufacture of molded masonry units, the mixes may be used to form pre-cast products or cast-in-place structures. Examples of these products and structures are beams, slabs, walls, floors, and the like. When employing the relatively dry mixes for casting, it is common to employ some type of vibrating, tamping, or ramming means to insure that the concrete will be well compacted and dense.

Molded masonry units such as concrete block, concrete pipe, and other molded concrete products may be prepared from mixes containing the additive composition of the invention by employing suitable types of masonry unit molding machines. Concrete blocks are generally molded in machines which employ vibrator or tamping mechanisms to achieve a dense uniform block while concrete pipe may be formed with such machines, by the use of centrifugal spinning machines or other densifying mechanical means. After the molding operation, the molded units are usually allowed to preset at room temperature before being cured. The curing operation may be performed in steam chambers in order to produce finished units which possess high strength after only a few hours.

The following examples show the benefits to be derived by employing the additive composition of the invention in mixes for the production of concrete blocks. Each example compares a plain mix containing only Portland cement, aggregate, and water with one or more mixes of the same components in which a particular additive composition of the invention is also included. The materials employed in the additive compositions were commercial grades where such were available.

The aggregate employed was a blend of quartz pea gravel and quartz sand. The cement employed was a type I Portland cement, and the ratio of cement to aggregate for all of the mixes was approximately 12% by weight. The water-cement ratio was approximately 0.48 by weight for all mixes except the additive mix of Example VI in which the ratio was approximately 0.41.

Concrete block was molded from each of the mixes on a Gene Olson hydraulically controlled machine which produced one 4 x 8 x 16-inch block per cycle. The molded blocks from each mix were permitted to pre-set for approximately four hours before being placed in a kiln and subjected to a low pressure steam curing cycle. The temperature of the kiln was raised at the rate of one degree per minute to a temperature of approximately 175° F., after which the steam was turned off. The kiln was left sealed and the blocks were allowed to remain in the kiln overnight. The normal drop in kiln temperature was approximately one degree per minute down to a temperature of about 120° F. By the following morning the temperature of the kiln was about 100° F., at which time the kiln was opened and the blocks removed and placed in a constant temperature-humidity room which was maintained at 70° F. and 50% relative humidity. The blocks remained in this room for 14 days, at which time they were removed for inspection and testing.

Each of the following examples gives the results of the measurement of compressive strength determined in accordance with ASTM specification C90-52 using cement-gypsum capping. The results given are the average strengths for six blocks made from the same mix except for Example II, in which the additive-containing blocks are the average of five blocks due to improper capping of one block. In the examples, the percentages listed for the components are by weight of the cement in the mix and the strengths are in pounds per square inch.

*Example I*

In this example, a series of mixes was prepared according to the above procedure. Four of the mixes contained additive formulations of the invention with a different carbohydrate component being present in each mix. Each additive-containing mix contained the following:

|   | Percent |
|---|---|
| Carbohydrate | 0.04 |
| Triethanolamine | 0.02 |
| Calcium chloride | 0.12 |
| Polyethenoxyoctylphenol | 0.02 |

The results below list the particular carbohydrate component present in each mix.

A plain or control mix containing no additive was also prepared at the same time that each additive-containing mix was prepared, and blocks were molded from both the plain mix and the additive-containing mix. The blocks produced were then cured according to the procedure set forth above.

The following table gives the compressive strength results at an age of 14 days for blocks made from each mix. The strengths given for the additive-containing blocks, as pointed out above, are the average of six blocks, while the figure given for the plain mix blocks is the average of six blocks for each of the four plain mixes or the average of 24 blocks.

|   | P.s.i. |
|---|---|
| Plain | 1770 |
| Arabinose | 2425 |
| Fructose | 2358 |
| Gluconic acid | 2305 |
| Sucrose | 2653 |

All of the blocks made with mixes containing the additive composition of the invention had a pleasing textural surface with a uniform water-webbed effect. The color was a uniform light gray. In contrast, the blocks made with the plain mixes were darker gray in color and did not have the pleasing water-webbed surface texture of the additive-containing blocks.

*Example II*

In this example, blocks were prepared according to the procedure of Example I except that the additive formulation contained the following:

|   | Percent |
|---|---|
| Sorbitol | 0.02 |
| Triethanolamine | 0.02 |
| Calcium chloride | 0.12 |
| Polyethenoxyoctylphenol | 0.02 |

As a comparison, blocks were also made from a plain mix prepared at the same time as the additive-containing mix. The compressive strength results 14 days after the formation of the blocks were as follows:

|   | P.s.i. |
|---|---|
| Plain | 1725 |
| Additive-containing blocks | 2073 |

The blocks made with the additive-containing mix were light gray in color and had a uniform water-webbed textural surface, while the blocks made from the plain mix were a darker gray color and did not have the pleasing textural surface of the additive-containing blocks.

*Example III*

A series of concrete blocks was prepared employing the additive formulation of Example II with the exception that the amount of sorbitol was doubled to 0.04%.

The 14-day compressive strengths of blocks formed from the mix containing the above additive formulation and from a plain mix were as follows:

|   | P.s.i. |
|---|---|
| Plain | 1765 |
| Additive-containing blocks | 2288 |

The additive-containing blocks had the pleasing light gray color and surface texture of the blocks formed with the additive mix of Example II.

*Example IV*

In this example, blocks were formed from a mix containing the additive formulation of Examples II and III except that the amount of sorbitol was increased to 0.07%.

The compressive strengths after 14 days for blocks formed from the additive mix and a companion plain mix were as follows:

|   | P.s.i. |
|---|---|
| Plain | 2121 |
| Additive-containing blocks | 2474 |

The blocks made with the additive-containing mix had the pleasing appearance of the additive-containing blocks of Examples II and III.

*Example V*

In this example, a series of blocks was made employing a mix containing the following additive formulation:

|   | Percent |
|---|---|
| Sorbitol | 0.04 |
| Triethanolamine | 0.02 |
| Calcium chloride | 0.12 |
| Polyethenoxynonylphenol | 0.02 |

For a comparison, blocks were also made from a plain mix prepared at the same time. After 14 days, both series of blocks were tested to determine their compressive strength. The results of these tests were as follows:

|   | P.s.i. |
|---|---|
| Plain | 1885 |
| Additive-containing blocks | 2511 |

The blocks made with the additive-containing mix had a pleasing textural surface with a uniform water-webbed effect. The color of the blocks was a light gray. In contrast, the blocks made with the plain mix were darker gray in color and did not have the water-webbed surface texture.

Example VI

Concrete blocks were made from a mix containing the additive formulation employed in Example V with the exception that the amount of the polyethenoxynonylphenol was increased to 0.035%.

A series of blocks was made from a plain mix at the same time. The 14-day compressive strength for each series of blocks was as follows:

|  | P.s.i. |
|---|---|
| Plain | 1962 |
| Additive-containing blocks | 2143 |

As shown by the foregoing detailed description and specific examples, the present invention provides a new additive composition which, when incorporated in cement mixes, permits the production of molded masonry units such as concrete block having improved strength and a pleasing appearance. This pleasing appearance is the result of their high degree of uniformity both of lightness of color and surface texture. Moreover, the employment of the additive composition of the invention in mixes used in the making of molded masonry units provides a number of processing advantages. The filling of the molds is facilitated as also is the stripping of the formed units from the molds. In addition, mixes containing the additive composition are less abrasive in character so that the wear on the molds and the other parts of the molding machines is substantially reduced. These and other processing advantages result in an increased rate of production, less breakage of the freshly molded units, and other benefits.

Furthermore, the additive composition of the present invention not only results in the achievement of the abovementioned advantages in the production of molded masonry units, but the additive composition also affords certain advantages in concrete mixes employed for the formation of pre-cast products and cast-in-place structures. For example, the additive composition produces mixes which are more dense and cohesive thus facilitating the placing and compacting of the concrete. Moreover, the products and structures produced have substantially improved strength as well as a high degree of uniformity of color and texture.

It is apparent from the above discussion that various modifications in the specific additive formulations and procedures described may be made within the scope of the invention. Therefore, the invention is not intended to be limited to the particular formulations and procedures described in detail herein, except as may be required by the appended claims.

What is claimed is:

1. An additive composition for incorporation in hydraulic cement mixes consisting essentially of between about 1 and 20 parts by weight of a carbohydrate selected from the group consisting of monosaccharides having 5 to 6 carbon atoms and disaccharides which are multiples of said monosaccharides, between about 5 and 30 parts by weight of a water-soluble chloride, between about 1 and 10 parts by weight of a water-soluble short chain alkyl amine, and between about 1 and 10 parts by weight of a water-soluble organic ethylene oxide condensation product formed by condensing ethylene oxide with a second organic compound having a functional group, said chloride being selected from the group consisting of alkali metal chlorides, alkaline earth metal chlorides and ammonium chloride, and said carbohydrate comprising an amount at least about as great as the amount of said alkyl amine and at least about as great as the amount of said ethylene oxide condensation product.

2. An additive composition for incorporation in hydraulic cement mixes consisting essentially of between about 1 and 20 parts by weight of a monosaccharide having 5 to 6 carbon atoms, between about 5 and 30 parts by weight of a water-soluble chloride, between about 1 and 10 parts by weight of a water-soluble short chain alkyl amine, and between about 1 and 10 parts by weight of a water-soluble organic ethylene oxide condensation product formed by condensing ethylene oxide with a second organic compound having a functional group, said chloride being selected from the group consisting of alkali metal chlorides, alkaline earth metal chlorides and ammonium chloride, and said monosaccharide comprising an amount at least about as great as the amount of said alkyl amine and at least about as great as the amount of said ethylene oxide condensation product.

3. An additive composition for incorporation in hydraulic cement mixes consisting essentially of between about 2 and 8 parts by weight of a carbohydrate selected from the group consisting of monosaccharides having 5 to 6 carbon atoms and disaccharides which are multiples of said monosaccharides, between about 5 and 30 parts by weight of a water-soluble chloride, between about 1.5 and 6 parts by weight of a water-soluble short chain alkyl amine, and between about 1 and 5 parts by weight of a water-soluble organic ethylene oxide condensation product formed by condensing ethylene oxide with a second organic compound having a functional group, said chloride being selected from the group consisting of alkali metal chlorides, alkaline earth metal chlorides and ammonium chloride, and said carbohydrate comprising an amount at least about as great as the amount of said alkyl amine and at least about as great as the amount of said ethylene oxide condensation product.

4. An additive composition for incorporation in hydraulic cement mixes consisting essentially of between about 2 and 8 parts by weight of a monosaccharide having 5 to 6 carbon atoms, between about 5 and 30 parts by weight of calcium chloride, between about 1.5 and 6 parts by weight of triethanolamine, and between about 1 and 5 parts by weight of a water-soluble organic ethylene oxide condensation product formed by condensing ethylene oxide with a second organic compound having a functional group, and said monosaccharide comprising an amount at least about as great as the amount of said triethanolamine and at least about as great as the amount of said ethylene oxide condensation product.

5. A hydraulic cement mix consisting essentially of a hydraulic cement, aggregate, water, and between about 0.01% and 0.2% by weight of the cement of a carbohydrate selected from the group consisting of monosaccharides having 5 to 6 carbon atoms and disaccharides which are multiples of said monosaccharides, at least about 0.05% by weight of the cement of calcium chloride, between about 0.01% to 0.1% by weight of the cement of a water-soluble short chain alkyl amine, and between about 0.01% and 0.1% by weight of the cement of a water-soluble organic ethylene oxide condensation product formed by condensing ethylene oxide with a second organic compound having a functional group, and said carbohydrate comprising an amount at least about as great as the amount of said alkyl amine and at least about as great as the amount of said ethylene oxide condensation product.

6. A hydraulic cement mix consisting essentially of a hydraulic cement, aggregate, water, and between about 0.01% and 0.2% by weight of the cement of a monosaccharide having 5 to 6 carbon atoms, between about 0.05% and 0.3% by weight of the cement of a water-soluble chloride, between about 0.01% and 0.1% by weight of the cement of a water-soluble short chain alkyl amine, and between about 0.01% and 0.1% by weight of the cement of a water-soluble organic ethylene oxide condensation product formed by condensing ethylene oxide with a second organic compound having a functional group, said chloride being selected from the group consisting of alkali metal chlorides, alkaline earth metal chlorides and ammonium chloride, and said monosaccharide comprising an amount at least about as great as the amount of said alkyl amine and at least about as great as the amount of said ethylene oxide condensation product.

7. A hydraulic cement mix consisting essentially of a hydraulic cement, aggregate, water, and between about 0.02% and 0.08% by weight of the cement of a monosaccharide having 5 to 6 carbon atoms, between about 0.05% and 0.3% by weight of the cement of a water-soluble chloride, between about 0.015% and 0.06% by weight of the cement of a water-soluble short chain alkyl amine, and between about 0.01% and 0.05% by weight of the cement of a water-soluble organic ethylene oxide condensation product formed by condensing ethylene oxide with a second organic compound having a functional group, said chloride being selected from the group consisting of alkali metal chlorides, alkaline earth metal chlorides and ammonium chloride, and said monosaccharide comprising an amount at least about as great as the amount of said alkyl amine and at least about as great as the amount of said ethylene oxide condensation product.

8. A hydraulic cement mix consisting essentially of a hydraulic cement, aggregate, water, and between about 0.02% and 0.08% by weight of the cement of a monosaccharide having 5 to 6 carbon atoms, between about 0.05% and 0.3% by weight of the cement of calcium chloride, between about 0.015% and 0.06% by weight of the cement of triethanolamine, and between about 0.01% and 0.05% by weight of the cement of a water-soluble organic ethylene oxide condensation product formed by condensing ethylene oxide with a second organic compound having a functional group, and said monosaccharide comprising an amount at least about as great as the amount of said triethanolamine and at least about as great as the amount of said ethylene oxide condensation product.

9. A molded masonry unit consisting essentially of a hydraulic cement, aggregate, and between about 0.01% and 0.2% by weight of the cement of a carbohydrate selected from the group consisting of monosaccharides having 5 to 6 carbon atoms and disaccharides which are multiples of said monosaccharides, between about 0.05% and 0.3% by weight of the cement of a water-soluble chloride, between about 0.01% and 0.1% by weight of the cement of a water-soluble short chain alkyl amine, and between about 0.01% and 0.1% by weight of the cement of a water-soluble organic ethylene oxide condensation product formed by condensing ethylene oxide with a second organic compound having a functional group, said chloride being selected from the group consisting of alkali metal chlorides, alkaline earth metal chlorides and ammonium chloride, and said carbohydrate comprising an amount at least about as great as the amount of said alkyl amine and at least about as great as the amount of said ethylene oxide condensation product.

10. A molded masonry unit consisting essentially of a hydraulic cement, aggregate, and between about 0.02% and 0.08% by weight of the cement of a monosaccharide having 5 to 6 carbon atoms, between about 0.05% and 0.3% by weight of the cement of calcium chloride, between about 0.015% and 0.06% by weight of the cement of triethanolamine, and between about 0.01% and 0.05% by weight of the cement of a water-soluble organic ethylene oxide condensation product formed by condensing ethylene oxide with a second organic compound having a functional group, and said monosaccharide comprising an amount at least about as great as the amount of said triethanolamine and at least about as great as the amount of said ethylene oxide condensation product.

References Cited in the file of this patent

UNITED STATES PATENTS

| | | |
|---|---|---|
| 2,031,621 | Tucker | Feb. 25, 1936 |
| 2,141,571 | Kennedy | Dec. 27, 1938 |
| 2,418,431 | Scripture | Apr. 1, 1947 |
| 2,437,842 | Uhler | Mar. 16, 1948 |
| 2,782,857 | Clark | Feb. 26, 1957 |
| 2,783,157 | Grant et al. | Feb. 26, 1957 |
| 2,790,724 | Bergman | Apr. 30, 1957 |
| 2,798,003 | Morgan et al. | July 2, 1957 |
| 2,801,931 | Morgan et al. | Aug. 6, 1957 |
| 2,860,060 | Benedict | Nov. 11, 1958 |
| 2,890,752 | Crone | June 16, 1959 |
| 2,927,033 | Benedict | Mar. 1, 1960 |

OTHER REFERENCES

Lea and Desch: "The Chemistry of Cement and Concrete," pub. 1956 by Edw. Arnold Ltd. of London, pages 517–518, 252–3.

Ind. & Eng. Chem., "Polyox," vol. 50, No. 1, pages 5–16, January 1958.